United States Patent Office 3,525,611
Patented Aug. 25, 1970

3,525,611
HETEROGENEITY BY SLIGHT OXIDATION PRIOR TO CONSOLIDATION
Dong M. Chay, Wilmington, Del., assignor to E. I. du Pont de Nemours and Company, Wilmington, Del., a corporation of Delaware
No Drawing. Filed June 23, 1969, Ser. No. 835,814
Int. Cl. C22c 29/00
U.S. Cl. 75—204      2 Claims

ABSTRACT OF THE DISCLOSURE

Dense bodies of tungsten carbide bonded with from 3 to 25% by weight of heterogeneous cobalt-tungsten solid-solution alloy are prepared by intimately mixing a tungsten carbide powder with cobalt, pelletizing the mixture, slightly oxidizing the pellets, then the mixed powder pellets are heated to a temperature above 1000° C. and are consolidated to yield a compact with a density of at least 98% of its theoretical density. The resultant bodies are strong, hard and impact resistant and useful in cutting and shaping very hard materials.

BACKGROUND OF THE INVENTION

This invention relates to a process for preparing tungsten carbide compositions bonded with a heterogeneous cobalt-tungsten solid solution alloy, said process comprising mixing a tungsten carbide powder with cobalt powder, pelletizing the powder mixture, and slightly oxidizing the pellets prior to densification.

It is shown in Meadows U.S. Pat. No. 3,451,791, that tungsten carbide compositions bonded with a homogeneous cobalt-tungsten alloy have an unusual combination of strength and hardness.

It has been discovered by Iler and Rigby that particular advantages are attendant to such compositions when the cobalt-tungsten alloy is not homogeneous but is heterogeneous as disclosed in their copending application Ser. No. 835,817 filed June 23, 1969.

Various means have been known in the art for adjusting the ratio of carbon:tungsten in cobalt/tungsten carbide compositions. However, such means inherently resulted in a homogeneous ratio. Means for deliberately producing heterogeneity or local variations in carbon:tungsten ratio have not been sought after or publicized.

I have discovered that such variations, which result in heterogeneity in densified compositions, can be induced most simply by mixing a tungsten carbide powder with cobalt powder to give a powder mixture in which the carbon:tungsten ratio is 1.0 or slightly higher; pelletizing the powder mixture; and then slightly oxidizing the pellets prior to consolidation. This procedure can be used to produce the dense tungsten carbide bodies bonded with heterogeneous cobalt-tungsten alloys described in the above mentioned application Ser. No. 835,817.

SUMMARY

In summary, this invention relates to a process for preparing a dense body of tungsten carbide bonded with from 3 to 25% by weight of a heterogeneous cobalt-tungsten alloy, said alloy consisting essentially of cobalt and an average of from 5 to 25% by weight of tungsten and said alloy comprising regions containing less than 8% by weight of tungsten interspersed with regions containing more than 8% by weight of tungsten, comprising the steps of:

(a) Intimately mixing cobalt and tungsten carbide powder having a carbon:tungsten ratio of 1.0 to 1.03, and pelletizing the mixed powder;

(b) Oxidizing the pellets with from 0.1 to 1% by weight of oxygen;

(c) Heating the mixture in an inert atmosphere at a temperature $T_s$ between 1000° C. and $T_h$° C. for from $t_s$ to 20 $t_s$ minutes, where $$\log_{10} t_s = \frac{13250}{T_s + 273} - 8.2$$

and $$T_h = \frac{6.5 - \log_{10}(P - 0.3)}{0.0039}$$

wherein P = percent by weight of cobalt;

(d) Pressing the hot composition to a density in excess of 99% of theoretical in a heated zone at a temperature of $T_m$ for a time of from $t_m$ to 20 $t_m$ minutes, where $$\log_{10} t_m = \frac{13250}{T_m + 273} - 8.2$$

and $$T_m = \frac{6.5 - \log_{10}(P - 0.3)}{0.0039} \pm 100°\ C.$$

and (e) Cooling the dense composition at a rapid rate.

DESCRIPTION OF THE INVENTION

As stated above, this invention is directed to a method for preparing dense bodies of tungsten carbide bonded with from 3 to 25% by weight of heterogeneous cobalt-tungsten alloy, said alloy consisting essentially of cobalt and an average of from 5 to 25% by weight of tungsten and said alloy comprising regions containing more than 8% by weight of tungsten interspersed with regions containing less than 8% by weight of tungsten, the method comprising the steps of (a) intimately mixing cobalt and a tungsten carbide powder having a carbon:tungsten ratio of 1.0 to 1.03, and pelletizing the mixed powder; (b) oxidizing the pellets with from 0.1 to 1% by weight of oxygen; and then (c) heating; (d) compressing; and (e) cooling the product.

The dense products prepared by this process are more fully described in Iler and Rigby's copending application Ser. No. 835,817 referred to above.

Starting materials

Starting materials for use in this invention are tungsten carbide and cobalt which are substantially pure, that is, containing no more extraneous matter than is found in the tungsten carbide and cobalt powders conventionally employed in making cobalt-bonded tungsten carbide cutting tools. Small amounts of iron, up to 0.5%, may be present from erosion of process equipment; but other than iron, the total impurities amount to less than 0.5% by weight, and preferably are present only in spectroscopically detected amounts.

Fine commercial tungsten carbide having an average grain size in the range of 0.5 to 1 micron may be used. A preferred starting material is colloidally subdivided tungsten carbide powder as described in copending application Ser. No. 772,810 filed Nov. 1, 1968. This tungsten carbide is in the form of crystallites of colloidal size well under half a micron in diameter, typically 30 or 40 millimicrons in diameter, the crystallites being linked together in porous aggregates, prepared by forming and precipitating tungsten carbide from a reaction medium of molten salt.

Cobalt suitable for use in this invention includes any source of cobalt metal which can be used to prepare an interdispersion of cobalt with tungsten carbide powder; for example, finely divided powder such as "Cobalt F," sold by the Welded Carbide Tool Co. The metal is preferably more than 99.5% pure cobalt, and should be free from impurities that would be harmful to the properties of cemented tungsten carbide.

Blending components

The cobalt and tungsten carbide powders suitable to be used in this invention must be intimately mixed. Extensive milling of the tungsten carbide with the metal is ordinarily employed to achieve an intimate mixture.

It is preferred to use a mill and grinding material from which a negligible amount of metal is removed, and it is usually preferred to use ballmills or similar rotating or vibrating mills. Suitable materials of construction for such mills are steel, stainless steel, or mills lined with cobalt-bonded tungsten carbide. The grinding medium, which is more susceptible to wear than the mill itself, should be of a hard, wear-resistant material such as a metal-bonded tungsten carbide. Cobalt-bonded tungsten carbide containing about 6% cobalt is a preferred grinding medium. The grinding medium can be in various forms as balls or short cylindrical rods about one-eighth to one-quarter inch in diameter, which have been previously conditioned by running in a mill in a liquid medium for several weeks until the rate of wear is less than .01% loss in weight per day. Mill loadings and rotational speeds should be optimized as will be apparent to those skilled in the art.

In order to avoid caking of the solids on the side of the mill, a sufficient amount of an inert liquid medium is ordinarily used to give a thin slurry of the tungsten carbide powder charged to the mill. One of the liquid media which are suitable for this purpose is acetone.

Ballmilling tungsten carbide in the presence of cobalt reduces the particle size of the tungsten carbide and distributes the cobalt uniformly among the fine particles of carbide. When it is necessary to reduce the particle size of the tungsten carbide it is preferred to mill the tungsten carbide separately prior to interspersing the carbide with cobalt. It is advantageous to start with the preferred colloidal tungsten carbide disclosed in copending application Ser. No. 772,810 referred to above, since it is not necessary to mill the tungsten carbide before it is milled with cobalt.

Milling of cobalt/tungsten carbide mixtures is continued until the cobalt is homogeneously interspersed with the finely divided tungsten carbide. Homogeneous interspersion is evidenced by the fact that it is essentially impossible to separate the cobalt from the tungsten carbide by physical means such as sedimentation or a magnetic field.

The mill is ordinarily fitted with suitable attachments to enable it to be discharged by pressurizing it with an inert gas. The grinding material can be retained in the mill by means of a suitable screen over the exit port. The liquid medium is separated from the milled powder such as by distillation and the powder is then dried under vacuum. Alternatively the solvent can be distilled off directly from the mill. The dry powder is then crushed and screened, while maintaining an oxygen-free atmosphere such as with nitrogen or argon, or by maintaining a vacuum.

Heterogeneity in the powder

Means for deliberately producing heterogeneity or local variations in the carbon:tungsten ratio have not been described in the prior art. Such variations can be produced by the process of this invention.

This process, which results in the desired heterogeneity, comprises partially oxidizing a pelletized powder which has been prepared such as by ballmilling cobalt and tungsten carbide having a carbon:tungsten ratio of 1.0 to about 1.03 and subsequently pelletizing the mixture by tumbling, for example. By this procedure the outer surface of the pellets becomes more highly oxidized than the interior. Thus a mixture of tungsten carbide and cobalt powders each from 1 to 10 microns in ultimate particle diameter can be ballmilled in an acetone medium for several days and then the mixture can be removed from the mill and the powder dried without exposure to the air. A small amount of non-volatile organic matter from the acetone remains on the powder. The powder can then be screened through a mechanically shaken screen of 60 meshes per inch under nitrogen, producing spherical pellets 10 to 100 microns in diameter. The pelleted powder will ordinarily be stored under nitrogen containing a low concentration of oxygen which is absorbed to an amount of from about 0.1 up to about 1% by weight. The powders can alternatively be brought slowly into the air providing the exposure is gradual enough to avoid local heating and excessive oxidation. Such an oxidized powder can give a consolidated body containing an average atomic ratio of carbon to tungsten of greater than 1.0, yet the body contains cobalt having more than 8% by weight of tungsten in solid solution. If oxidation is excessive, as much as 20% by weight of tungsten on the average is found in the cobalt phase, and the acid resistance measured as described in Meadows U.S. Pat. No. 3,451,791 may approach 50 hours. It is believed that the surface regions of the spherical pellets becomes more highly oxidized than the interior, and that when the powder is compressed and the composition is heated there results a three-dimensional continuum of carbon deficient composition derived from the surface regions of the pellets in which the cobalt binder phase is rich in dissolved tungsten, while those portions of the body derived from the interior regions of the pellets remain as regions less deficient in carbon, containing little or no tungsten and having low acid resistance. It is believed that these interior-derived regions of the compositions reduce brittleness because of the ductility of the pure cobalt binder.

Identification of the heterogeneous regions is sometimes difficult. However, by metallographic procedures, X-ray diffraction analysis, electrical resistivity measurements and curie temperature measurements, regions high in carbon and cobalt regions low in tungsten can be identified in the present of regions low in carbon, and cobalt regions high in tungsten. Methods for carrying out these analyses are described in application Ser. No. 835,817 referred to above.

Heterogeneity preferably occurs only on a microscopic scale, but may occur in regions as large as a tenth of a millimeter.

Consolidation of the powder

Generally speaking, consolidation is carried out in the manner described in Meadows U.S. Pat. No. 3,451,791, referred to above, i.e. by heating and compressing the powders.

It is important that when the pelletized powder composition is being heated for the first time it should not be subjected to excessive pressure or mechanical constraint, especially when in a graphite or carbon container. Pressure can be applied providing it is not sufficient to keep the sintering billet in intimate contact with the graphite walls of the mold. With some powder pellets a pressure of up to 1000 p.s.i. can be applied during the heating step, since even under such pressure the billet shrinks away from the mold and is not seriously carburized. The harm that is caused by excessive compression may be due either to shearing forces which disturb the internal structure of the composition at the beginning of recrystallization and sintering, or it may be due to chemical effects from contact with material such as graphite which is ordinarily used to apply the pressure. Thus it has been observed that application of pressure to the composition while in an alumina mold is less harmful to the resultant bodies, even using pressures higher than 1000 p.s.i. The harm also may be due to trapping of gases in pores that are collapsed by the pressure. In the absence of pressure such pores would not normally become closed at this stage of sintering.

If the powder is first heated without application of pressure to a prescribed temperature it can thereafter be consolidated to density and molded by hot pressing in a carbon mold without absorbing undesirable amounts of carbon. I have found that after the tungsten has dissolved in the cobalt phase during the heat treatment it is much less readily carburized.

Heat treatment is carried out in an inert atmosphere or in a vacuum. An inert atmosphere is one that does not react with the powder, such as argon or hydrogen. Heat treatment is carried out at a temperature $T_s$ which is above 1000° C., but generally below the final consolidating temperature, $T_m$, and the treatment lasts for about $t_s$ to 20 $t_s$ minutes, where:

$$\log_{10} t_s = \frac{13250}{T_s+273} - 8.2 \text{ minutes}$$

and $$T_m = \frac{6.5 - \log_{10}(P-0.3)}{0.0039} \pm 100° \text{ C.}$$

where P=percent by weight of metal in the composition.

Thus the composition is heated to temperature $T_s$ and held for a minimum of $t_s$ minutes. The maximum time of heating is not critical at temperatures below which no appreciable grain growth of tungsten carbide occurs, namely below about 1200° C. However, above 1200° C., the time should not exceed about 20 $t_s$. For example, at 1000° C., it is necessary to heat for at least 2½ hours and preferably several times this long; at 1100° C. the composition is heated for at least 13 minutes; at 1200° C. the hold time is a minimum of about 5 minutes and not over two hours; at 1400° C. the hold time is less than 10 minutes, and at 1500° C. it is less than 4 minutes.

It should be noted that the temperatures and times required vary to some extent with the size of samples, dimensions of equipment, heating rates attainable and the like. For example, it is possible to carry out the heating step either on loose powder pellets or preconsolidated billet while the sample is being heated to the temperature at which it is to be finally consolidated. Such heating should be carried out rapidly in the range above 1200° C., providing the sample is heated relatively uniformly throughout its volume. An integrated combination of temperatures and times equivalent to the fixed times and temperatures described, is in keeping with the spirit of the invention, and will be apparent to those skilled in the art.

A preferred method of fabrication is by hot pressing the pelleted powders in the manner described below. Various types of hot pressing equipment are known in the art. Depending on press design and desired operating characteristics, heating can be by resistance heating, induction heating, or plasma torch heating. Short heating times of a few seconds duration are attainable by resistance sintering under pressure.

Temperature can be measured very near the sample itself by means of a radiation pyrometer and can be cross-checked for accuracy with an optical pyrometer. Such instruments should be calibrated against primary standards and against thermocouples positioned in the sample itself so that actual sample temperatures can be determined from their readings. Automatic control of heat-up rate and desired temperature can be achieved by appropriate coupling mechanisms between a radiant pyrometer and the power source.

The mold can be of a variety of shapes but is usually cylindrical, with a wall thickness of up to an inch or more. It is particularly advantageous to use a cylinder with a cross-section which is circular on the outside and square in the inside in pressing bodies to be used as cutting-tip inserts, thereby fabricating them as near as possible to their final desired dimensions.

As an example, for a 1 inch in diameter finished pressed round disc, the shell is cylindrical, 1 inch in inside diameter, 1¾ inches in outside diameter, 4 inches in length. Thin graphite discs ¼ inch in thickness and 1 inch in diameter are loaded in the cylinder on top and bottom of the material to be pressed. The surface of the graphite discs in contact with the sample can have a conical depression ⅛ inch in diameter at the center to form a tip on the sample and keep it positioned in the center of the mold when it shrinks away from the sides due to sintering. Graphite pistons 1 inch in diameter and 2 inches long are loaded in both ends of the cylinder in contact with the ¼ inch discs and protruding from the cylinder.

Graphite parts used in the press tend to oxidize at the pressing temperatures used, and it is therefore necessary to maintain a non-oxidizing atmosphere or vacuum within the press. In addition to prolonging the life of the graphite parts, the use of a vacuum or an inert atmosphere makes it possible to remove the mold containing the hot pressed body from the heart of the induction heated furnace and cool the sample much more quickly than if it were left to cool in the hot zone of the furnace after shutting off the power. The press can be arranged to permit the mold to be removed from the hot furnace, and when this is done the mold cools very rapidly by radiation. Thus the mold described above, removed from the furnace at 1400° C., cools to dull red heat, about 800° C., in about 3 minutes.

Pelleted powders which have been slightly oxidized and which are still pyrophoric or absorb oxygen excessively upon expousre to air, should be loaded into the mold in a non-oxidizing atmosphere, for example in a glove box filled with inert gas. The appropriate discs and pistons can then be inserted and the loaded mold can be handled with the contained pellets essentially loosely packed or, for example, with no more pressure than can be applied to the pistons with the fingers. However, it is often convenient to apply about 200 to 400 p.s.i. pressure with a small press, to give a more compacted sample for greatest ease in handling.

In a preferred aspect of this invention, cobalt/colloidal tungsten carbide pellets are pressed at about 200 p.s.i. as they are loaded into the mold, they are then brought to the maximum temperature with no pressure on the pistons, and held for 2 to 5 minutes at maximum temperature before applying any pressure. During the period at maximum temperature with no pressure applied, the body shrinks due to sintering. At the end of the period, the body attains 80–90% of theoretical density and its diameter is about 60% of the mold diameter. The pressure is then applied, reaching maximum in 15 to 30 seconds, and the presintered body is reformed into conformity with the mold. Maximum pressure and temperature are applied until complete densification is attained, as indicated when movement of the rams ceases. This ordinarily does not require more than 5 minutes, and usually only one minute, after which the sample is immediately removed from the hot zone and permitted to cool rapidly by radiation to below 800° C. in about five minutes or less. The sample is preferably cooled at a rate in excess of 10° C. per minute.

The conditions which give rise to the preferred dense cobalt-bonded bodies are quite important and should be precisely established for the particular composition and the type of structure desired.

Unduly long presintering times before application of pressure can be harmful due to excessive crystallite growth and the development of too extensive and rigid a cross-linked carbide structure. Too early an application of pressure can also be harmful as pointed out above. Holding the sample for too long a time at maximum temperature should also be avoided, not only because of a tendency towards carburization but also because secondary crystallite growth tends to cause a coarsening of the structure and eventually the development of porosity. Cooling too slowly can also be detrimental if the sample remains at high temperature long enough for undesirable crystallite growth and structural changes to occur. These structural changes can include changes in the composition of the cobalt binder phase. Thus with a low carbon content and the corresponding large amount of tungsten initially in the cobalt phase, precipitation of eta phase occurs at elevated temperatures. This can be minimized by brevity of hot pressing and rapidity of cooling of the present product. Generally speaking, it is undesirable to have more than about 20% by weight of eta phase in the binder, and it is preferred to have less than 5% eta phase in the binder.

While it is preferred that the products of this invention be made by heating and sintering lightly compacted, finely divided, pelleted cobalt/tungsten carbide powders, followed immediately by application of pressure, it is sometimes desirable to carry out the the sintering step as a separate operation.

Thus, in order to achieve maximum productivity from a hot press, the initial sintering step can be carried out in a separate furnace in an inert atmosphere. This can be accomplished in several ways. For example, the starting pellets can be loaded or lightly compacted into molds to be later used for hot pressing, and then heated rapidly in an inert atmosphere to a temperature within from 50 to 200° of the final hot pressing temperature to be employed. The mold and its partially sintered contents, while still hot, can be passed directly into a hot pressing operation.

Maximum productivity can also be achieved by cold-pressing the pellets at pressures ranging from 10 to 100 tons per square inch and then sintering a number of the cold-pressed billets simultaneously.

The maximum temperature at which the bodies should be pressed is largely dependent on the cobalt content, although the proper temperature is to some extent dependent on the size of the molded piece, the heating rate, and the available pressure as well. The compositions of this invention are conveniently subjected to a maximum temperature of $T_m$ for a period of $t_m$ to 20 $t_m$ minutes, where $$T_m = \frac{6.5 - \log_{10}(P-0.3)}{0.0039} \pm 100° \text{ C.}$$

and $$\log_{10} t_m = \frac{13250}{T_m + 273} - 8.2 \text{ minutes}$$

where P is the percent by weight of metal in the composition.

Thus, for compositions containing 6% cobalt $T_m$ is about 1450° C., and for compositions containing 12% cobal, $T_m$ is about 1400° C.

It is preferred to bring the sample to the desired temperature as rapidly as possible. For example, a sample 1 inch in diameter can be heated to 1400° C. in 4 to 5 minutes, or to 1850° C. in 6 to 7 minutes, by introducing the mold into a preheated graphite block, the limiting factor being the rate of heat transfer from the graphite equipment via the mold to the sample. Rapidity of heating is especially important in compositions which have an atomic ratio of carbon:tungsten close to 1.0.

Pressure can be applied to the cobalt/tungsten carbide composition in a hot press through the action of remotely controlled hydraulic pneumatic rams. Applying pressure simultaneously through two rams to the top and bottom gives more uniform pressure distribution within the sample than does applying pressure through only one ram. An indicator can be attached to each ram to show the amount of ram movement, thereby allowing control of sample position within the heat field and indicating the amount of sample compaction. The end section of the rams, which are exposed to the high temperature zone should be made from graphite.

A variation of 100° from the mean specified temperature provides to some extent for the variables mentioned above. Thus, in order to attain temperature equilibrium in the interior without overheating the exterior, larger bodies require a lower temperature, which also permits a longer heating time. Higher temperatures and shorter times can be employed when high molding pressures can be used and smaller molded bodies are being made.

The most important factor in determining consolidation conditions is the physical nature of the heat-treated composition of the invention. When the composition is a heat-treated powder, for example, it can be loaded into graphite molds and heat and pressure simultaneously applied until the material reaches the recommended temperature range, $T_m$ at which the pressure is maintained for the specified time. The required pressure may be as low as 100 to 200 pounds per square inch for compositions such as those containing 15 to 25 percent by weight of cobalt and which are soft at the pressing temperature. Several thousands of pounds per square inch is required for bodies containing one to three percent cobalt, although pressures of not more than 4000 pounds per square inch are usually used where operations are in graphite equipment.

For compositions containing from 5 to 12 percent cobalt the required pressure can also vary according to the physical nature of the composition. Thus if a sintered powder composition is used, which has been heat-treated at a temperature $T_s$ close to the maximum allowable temperature $T_m$, a high pressure such as 4000 p.s.i. is preferably applied over a prolonged period, often continuously, while the mass is heated from 1000° C. to temperature $T_m$.

On the other hand, if degassed powder is preconsolidated to relatively high density such as about 50 percent of theoretical density, so that voids or pores larger than about ten microns are eliminated, and this compact is then heat-treated at temperature $T_s$, it shrinks spontaneously to a coherent body. If $T_s$ is then raised to $T_m$, sintering continues and a relatively dense body is obtained which can then be molded by brief application of pressure at temperature $T_m$.

Compositions of the invention require application of pressure at the defined maximum temperature, $T_m$, to eliminate voids. In such instances the consolidation is carried out until the body reaches a density of greater than 98% and preferably greater than 99 percent of theoretical, corresponding to a porosity of less than one percent by volume. However, for many uses even this degree of porosity may be too high. The porosity of the bodies of this invention is characterized by preparing polished cross-sections of the bodies for examination under a metallurgical microscope. Pores observed in this way are classified according to a standard method recommended by the American Society for Testing Materials (ASTM) and described on pp. 116 to 120 in the book entitled "Cemented Carbides," published by the MacMillan Company of New York (1960). Thus, bodies of this invention are preferably pressed until a porosity rating of A-1 is obtained especially where the material is to be subjected to heavy impact or compression. This corresponds to a density of essentially 100% of theoretical or a volume porosity of about 0.1%. However, porosities as great as A-3 or A-4 are suitable for many uses, since such bodies nevertheless have very high transverse bending strength. Even a porosity rating of A-5 corresponds to a density of about 98 percent and a porosity around 2 percent, is acceptable for the dense compositions.

Pressures of from 500 to 6000 p.s.i. can be used in graphite equipment, but generally speaking not over 4000 p.s.i. can be applied without danger of breaking the equipment, unless the graphite mold and plungers are reinforced with a refractory metal such as tungsten or molybdenum.

Instead of loading powder pellets into a mold, preconsolidated compacts in the form of billets can be prepared and heat-treated and then loaded in a mold for hot pressing. Such heat-treated, sintered billets can also be shaped by rolling or forging in an inert atmosphere.

After final consolidation to a dense billet the compositions of this invention can be further shaped by bending, swaging, or forging at about temperature $T_m$. Similarly, pieces can be welded together by bringing two clean surfaces together under pressure.

UTILITY

Some of the products of this invention are extremely dense, impact resistant, wear resistant, extremely hard, and are very strong. They are therefore suitable for use in the numerous ways in which such refractory materials are conventionally used. Some of the other uses to which the products of this invention can be put include cutting tools, drilling bits, as binders or matrices for other hard abrasives, and many other specific uses apparent to those skilled in the art.

Products of this invention are used in tools in which unusual strength is required in combination with high hardness. They are particularly advantageous in tools in which conventional cobalt-bonded tungsten carbide tools fail by flaking, chipping, or cracking, such as in tools for form cutting, cut-off, milling, broaching and grooving. Thus they find extensive use where, because of the inadequacies of cobalt-bonded tungsten carbide of the prior art, high speed steel tools are still employed.

Because of the unusual fine grain size, products of this invention are useful in tools where extremely small cross-sections are encountered, as for example in rotary tools smaller than an eighth of an inch in diameter such as end mills, drills and routers; knives having a cutting edge with an included angle less than about 30°; and steel-cutting tools which cut with high rake angles such as broaches, thread chasers, shaving or planing tools, rotary drills, end mills, and teeth for rotary saws. While the products of this invention containing more than about 12% cobalt are not stronger than products of this invention containing from 5 to 12% cobalt, nevertheless, the impact strength and toughness is higher. These are generally useful where tool steels are normally employed, and have the advantage of higher hardness than tool steels.

The process of this invention is further illustrated in the following example wherein parts and percentages are by weight unless otherwise noted.

EXAMPLE

This example describes the preparation of a dense body of tungsten carbide bonded with 9.7% cobalt possessing unusual high strength and hardness, having an extremely fine grain size and low porosity, and having a hereterogeneous distribution of tungsten in the cobalt, made by preparing a very finely divided intimate mixture of cobalt and tungsten carbide powders, pelletizing the mixture, slightly oxidizing the pellets, heating the mixture in an inert atmosphere and consolidating under pressure to a dense strong body.

To a steel mill having a capacity of about one gallon and a diameter of 8 inches, are charged 14,000 parts of grinding cylinders ¼ inch long and ¼ inch in diameter of tungsten carbide bonded with 6% cobalt. The cylinders have been previously conditioned by tumbling in acetone in the mill for two weeks in order to wear off all sharp corners. This "preconditioning" is continued until the rate of wear under milling conditions is less than about 10 parts in 5 days when used to mill compositions of this invention.

Into the mill is also charged 1800 parts of fine commercial tungsten carbide powder and 1450 parts of acetone. The fine tungsten carbide powder has a specific surface area as determined by nitrogen adsoprtion of 0.66 square meter per gram. By X-ray line broadening the average crystallite size is 370 millimicrons. Examination of the powder with an electron microscope reveals dense aggregates in the size of 2 to 10 microns, the aggregates being comprised of tungsten carbide grains in the size range from 0.5 to 2 microns, with an average of around ½ or 1 micron. Chemical analysis of this powder is 93.2% tungsten, 6.32% total carbon, and 0.31% of oxygen.

The charge occupies about half of the volume of the mill. Milling is carried out by rotating the mill at 75 revolutions per minute, the lid being tightly sealed to prevent loss of contents. Milling is continued for 48 hours. The mill is then permitted to cool and is opened. Two hundred and fifty parts of cobalt powder are added. The cobalt powder has a specific surface area of 0.7 square meter per gram and an average grain size of about one micron. The mill is closed and milling continued for 72 hours, at a rate of 75 r.p.m. The mill is then permitted to cool and the lid is replaced by a discharge cover and fitted with inlet and outlet connections so that the contents are transferred to a container maintained in an atmosphere of nitrogen throughout the operation. Three portions of acetone of 395 parts each are used to wash out the mill. The solids in the receiver flask are allowed to settle and the bulk of the acetone is siphoned off. The flask is then evacuated and warmed from the exterior to distill off the acetone and the temperature of the flask is brought to 125° C. after the distillation is completed. The contents are maintained at that temperature under a vacuum of less than a tenth of a milliliter of mercury for about 4 hours. The flask is then cooled and filled with pure nitrogen and transferred to a nitrogen filled glove box. In this inert environment the solids are removed from the flask and screened through a sieve having 70 meshes per inch to give essentially spherical pellets. The surface of the powder pellets is then slightly oxidized by storing them in a nitrogen atmosphere containing 0.3% by volume of oxygen.

Analysis of the powder, which is maintained continuously under nitrogen is 5.42% total carbon, 0.09% free carbon, 0.46% oxygen, 12.76% cobalt and the remainder being tungsten. The specific surface area by nitrogen adsorption is 2.8 square meters per gram and the crystallite size of the tungsten carbide by X-ray diffraction is 80 millimicrons. The density of this powder when tapped in a container to maximum settling is 35 percent of the theoretical density.

This powder has an atomic ratio of combined carbon to tungsten of 1.00 and the free carbon is uniformly distributed throughout the powder as particles less than a micron in size.

Fifty-five parts of the powder described above is charged in an oxygen-free environment to a 1 inch diameter cylindrical graphite mold and close-fitting graphite pistons are inserted in each end. The mold containing the powder is pressed at 200 p.s.i. and is then transferred to a vacuum hot press. After evacuation the sample, under no pressure, is brought to 1400° C. by induction heating in seven minutes and held at this temperature for five minutes. During the heating the sample sinters and shrinks away from contact with the mold surface, thus avoiding carburization.

Hydraulic pressure is then applied to both pistons and the pressure on the sample in the mold is brought to 4000 p.s.i. in a period of half a minute. The sample is subjected to a pressure of 4000 p.s.i. at 1400° C. for one minute, by which time no further movement of the pistons is observed. The mold containing the sample is then ejected from the hot zone and allowed to cool to 800° C. in two minutes in the evacuated chamber of the press. After allowing to cool to less than 100° C. the mold is removed from the vacuum chamber and a dense sample in the form of a cylindrical disc or billet, 1 inch in diameter and a quarter of an inch thick, is recovered.

Samples are prepared from the billet by diamond sawing and grinding for measurement of strength and hardness. The transverse rupture strength is 550,000 p.s.i. and the hardness 91.3 Rockwell A. Examination of the microstructure shows some porosity, with an ASTM rating of A2. The cobalt distribution is extremely uniform, the tungsten carbide grains are substantially all smaller than 1 micron, are generally equiaxed, no eta phase is observed, and the mean grain diameter is 0.5 micron. The carbon content is 5.44 and the atomic ratio of carbon to tungsten is 0.96, some carbon having been lost by combining with the oxygen in the powder and being evolved as carbon monoxide during sintering.

The cobalt recovered after removing the tungsten carbide contains 11.5 percent of tungsten, as determined by X-ray diffraction. The distribution of tungsten in the cobalt phase is heterogeneous with some regions containing less than 8% tungsten.

I claim:

1. A process for preparing a dense body of tungsten carbide bonded with from 3 to 25% by weight of a heterogeneous cobalt-tungsten alloy, said alloy consisting essentially of cobalt and an average of from 5 to 25% by weight of tungsten, and said alloy comprising regions containing less than 8% by weight of tungsten interspersed with regions containing more than 8% by weight of tungsten, the process comprising the steps of:
   (a) intimately mixing cobalt, and a tungsten carbide powder having a carbon:tungsten ratio of 1.0 to 1.03, and pelletizing the mixed powder;
   (b) oxidizing the pellets with from 0.1 to 1% by weight of oxygen;
   (c) heating the mixture in an inert atmosphere at a temperature $T_s$ between 1000° C. and $T_h$° C. for from $t_s$ to 20 $t_s$ minutes where $$\log_{10} t_s = \frac{13250}{T_s + 273} - 8.2$$

and $$T_h = \frac{6.5 - \log_{10}(P-0.3)}{0.0039}$$

wherein P=percent by weight of cobalt;
   (d) pressing the hot composition to a density in excess of 98% of theoretical in a heated zone at a temperature of $T_m$ for a time of from $t_m$ to 20 $t_m$ minutes, where $$\log_{10} t_m = \frac{13250}{T_m + 273} - 8.2$$

and $$T_m = \frac{6.5 - \log_{10}(P-0.3)}{0.0039} \pm 100° C.$$

(e) cooling the dense composition at a rapid rate.
2. The process of claim 1 wherein the cooling rate is in excess of 10° C. per minute.

References Cited

UNITED STATES PATENTS

| | | | |
|---|---|---|---|
| 873,745 | 12/1907 | Haynes | 75—171 |
| 1,057,423 | 4/1913 | Haynes | 75—171 |
| 1,338,132 | 4/1920 | Honda | 75—171 |
| 1,951,133 | 3/1934 | De Bats | 23—208 |
| 1,998,609 | 4/1935 | Comstock | 75—204 |
| 2,011,369 | 8/1935 | McKenna | 29—182.8 |
| 2,113,171 | 4/1938 | Cooper | 29—182.8 |
| 2,116,399 | 5/1938 | Marth | 75—204 |
| 2,122,403 | 7/1938 | Balke | 29—182.7 |
| 2,731,711 | 1/1956 | Lucas | 29—182.8 |

FOREIGN PATENTS

| | | |
|---|---|---|
| 1,041,958 | 9/1966 | Great Britain. |

OTHER REFERENCES

Metals Handbook, 1948 edition, American Society for Metals, Novelty Park, Ohio, p. 63.

BENJAMIN R. PADGETT, Primary Examiner

A. J. STEINER, Assistant Examiner

U.S. Cl. X.R.

75—211, 214, 226, 227